Oct. 17, 1967   J. B. WRIGHT ET AL   3,348,096
VARIABLE PULSE ENERGY DISCRIMINATOR
Filed Aug. 25, 1964

James B. Wright
James Darryl Holder,
    INVENTORS.

BY Harry M. Saragovitz
   Edward J. Kelly
   Herbert Berl
   James T. Deaton
        ATTORNEYS

United States Patent Office 3,348,096
Patented Oct. 17, 1967

3,348,096
VARIABLE PULSE ENERGY DISCRIMINATOR
James B. Wright and James Darryl Holder, Huntsville, Ala., assignors to the United States of America as represented by the Secretary of the Army
Filed Aug. 25, 1964, Ser. No. 392,377
10 Claims. (Cl. 315—109)

ABSTRACT OF THE DISCLOSURE

A variable pulse energy discriminator utilizing a gas filled electron device having three electrodes and a resistance-capacitance network to control and determine the minimum level of input voltage applied to a load. A voltage input calibration device may be built in or attached to the discriminator for varying circuit elements to activate or trigger the device at a desired voltage input level.

---

This invention may be manufactured and used by or for the Government for governmental purposes without the payment of any royalty thereon.

This invention relates to an electronic circuit for detecting the level of energy contained in a pulse with respect to a preset potential and thereby providing a closed circuit to a load device when the impressed energy is above the preset value.

In exploding bridge wire systems, there is a need for a test circuit device that can be used repeatedly for testing the condition of the exploding bridge wire system. In addition to being capable of repeated use, the test circuit device needs to be accurate, reliable, fast acting and have a long life span.

Therefore, it is an object of this invention to provide a variable pulse energy discriminator device that is reliable, simple, accurate and fast acting for testing of exploding bridge wire systems.

Another object of this invention is to provide a variable pulse energy discriminator device that includes a normally open switch device that will close at a finely defined threshold level.

A further object of this invention is to provide a variable pulse energy discriminator device that is applicable for detecting and/or protecting against voltage surges, lightning influx, and static potentials on power lines, missiles, aircraft, railroad, automotive, and other similar mechanisms.

A still further object of this invention is to provide a variable pulse energy discriminator device that is unpowered and is therefore readily useful for long term or permanent monitoring and/or protection.

Yet another object of this invention is to provide a new and novel load device for use in the circuit of a variable pulse energy discriminator.

In accordance with this invention, a variable pulse energy discriminator device is provided that has an electric circuit with a gas filled spark gap device therein. The gas filled spark gap device is designed with the circuit so that when an impressed high voltage above a preset value is supplied to the gas filled spark gap device, the gas filled spark gap device will provide a closed circuit to a load device for the high voltage.

In the accompanying drawing forming a part of this specification, and in which like numerals are employed to designate corresponding parts throughout the same:

Figure 1:
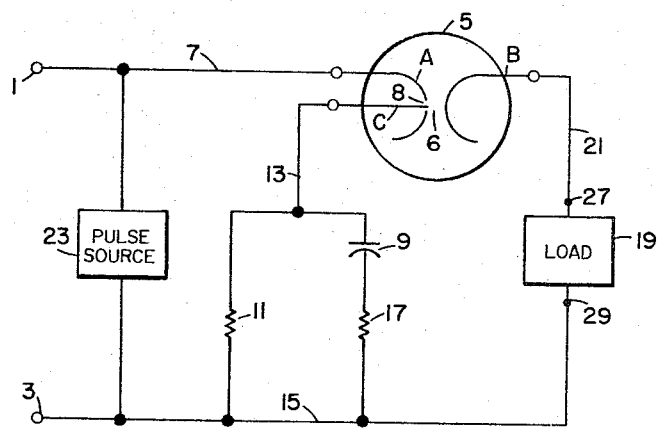
FIGURE 1 is a circuit diagram of a variable pulse energy discriminator device.

Referring to FIGURE 1, input terminal 1 is adapted to be connected to the equipment or items to be tested or protected, and common terminal 3 is adapted to be connected to ground or a common point of the equipment or items. If proper precautions are taken, terminals 1 and 3 may have their functions interchanged.

A multiple element gas filled spark gap device 5 is shown as having main electrodes A and B that form a discharge gap 6 and a trigger probe electrode C that forms an ignition gap 8 with electrode A. Electrode A is connected to terminal 1 by lead 7. Trigger probe electrode C is connected to one side of capacitor 9 and resistor 11 by lead 13. The other side of resistor 11 is connected to terminal 3 by lead 15, and the other side of capacitor 9 is connected through resistor 17 to lead 15.

Electrode B is connected to one side of load device 19 by lead 21, and the other side of load device 19 is connected to terminal 3 by lead 15.

A high voltage supply calibration device 23 is connected to leads 7 and 15 to provide a high voltage pulse when desired so that the triggering voltage level of the circuit may be adjusted by varying circuit parameters, particularly the value of resistor 17 and capacitor 9. Calibration device 23 may be built directly into the circuit or may be a separate unit reserved for periodic calibration.

In operation, when a high voltage is impressed across terminals 1 and 3, the full potential is developed between electrodes A and C. If the impressed voltage is of sufficient magnitude, ignition gap 8, which is a low energy quick response gap, will begin to conduct energy and inject a quantity of ions into discharge gap 6. If the current flow between electrodes A and C is sufficiently large to cause complete ionization, an arc will develop between electrodes A and B across discharge gap 6 and apply the impressed voltage level to the load. If the current flow between electrodes A and C is not enough to cause complete ionization but an abnormal voltage impulse is sufficiently large enough to cause ionization, an arc across discharge gap 6 will occur and the impressed voltage level will be developed across the load. The adjustment of capacitor 9 and resistor 17 determines the current magnitude between electrodes A and C for a given voltage input level, thereby determining whether the tube will be fully ionized by the current flow resulting from the impressed voltage at terminals 1 and 3. The energy from the ignition gap mainly flows into capacitor 9 and charges it to some voltage, the rate of charge being controlled by resistor 17. The ignition gap will cease conduction when this charging current falls below the minimum arc holding value. If the impressed voltage at terminals 1 and 3 has a value less than the value required to cause ionization of gap 6, capacitor 9 will be charged to some value dependent on the duration of the voltage pulse and the rate of charge of capacitor 9. The intensity of the arc in ignition gap 8 controls the amount of ionization and injection energy of these particles in discharge gap 6. These factors with the impressed voltage across electrodes A and B determine if discharge gap 6 conducts. For all items being fixed, this circuit will selectively conduct from terminals 1 and 3 to load device 19 those voltage levels which are above a preselected level.

After tube 5 has been fully ionized, the impressed voltage will be maintained across the load until the pulse voltage falls below a value that can sustain the current arc across gap 6. Gap 8 will have ceased conduction if capacitor 9 has been charged to a value that would limit the current flow through gap 8 to below the minimum arc holding value.

The basic function of capacitor 9 and resistor 17 is to provide initially a low impedance current path through electrodes A and C to the voltage applied at terminals 1 and 3. This low impedance allows a large current flow, depending on the voltage impressed, to fully ionize tube 5. Critical adjustment of capacitor 9 and resistor 17, for a selected voltage input at terminals 1 and 3, will yield sufficient ionization in tube 5 to produce an arc between electrodes A and B. The voltage applied at terminals 1 and 3 serves both as the trigger for tube 5 and as the voltage load 19. Between arcs of gap 8, resistor 11, which has a high ohmic value, discharges capacitor 9.

Figure 2:
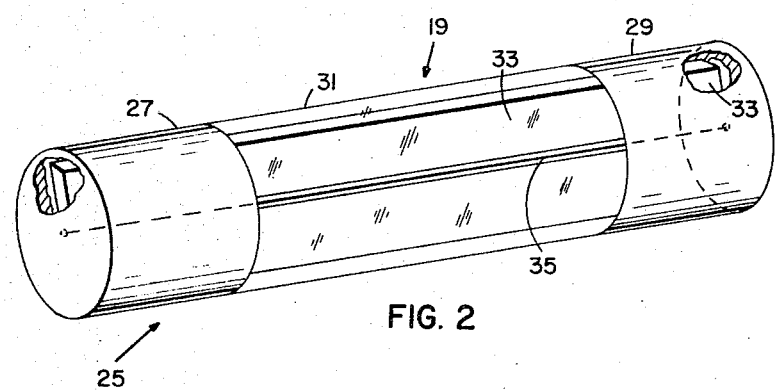
FIGURE 2 is a perspective view, partially cutaway, of a load device that may be used in a variable pulse energy discriminator circuit.

A basic load device suitable for use in the above described circuit is shown in FIGURE 2 and includes a hollow housing 25 that has metallic end terminals 27, 29 and an intermediate transparent section 31. A backing strip 33 is mounted in housing 25 in a conventional manner, and a fuse wire 35 is imbedded in or in close contact with backing strip 33 with one end connected to end terminal 27 and the other end connected to end terminal 29. Backing strip 33 serves as a mechanical support for fuse wire 35 and aids in visually determining the state of this wire. Backing strip 33 may be made of paper, fiber, plastic or some other electrical non-conductor. Backing strip 33 is preferably light in color on the side that the fuse wire is nearest in order to intercept and retain as a smudge the metallic vapors and other products of wire fusion.

Alternatively, backing strip 33 may be coated with, impregnated with or made from combustible or mildly explosive chemicals which will ignite upon fusion of the fuse wire. These chemicals may be of differing sensitivities and separated to prevent one from igniting another so that an approximation of the energy released upon fusing of the fuse wire can be obtained by recognizing the least sensitive ignited chemical. Still further, the fuse wire may also be monitored by the use of a photosensitive electric device (not shown) which can detect the light flash as the fuse wire fuses or the light flash of any combustible or mildly explosive chemicals used. The output of this photo-sensitive electric device can in turn, make an indication by the use of lights, meters or other suitable means.

Figure 3:
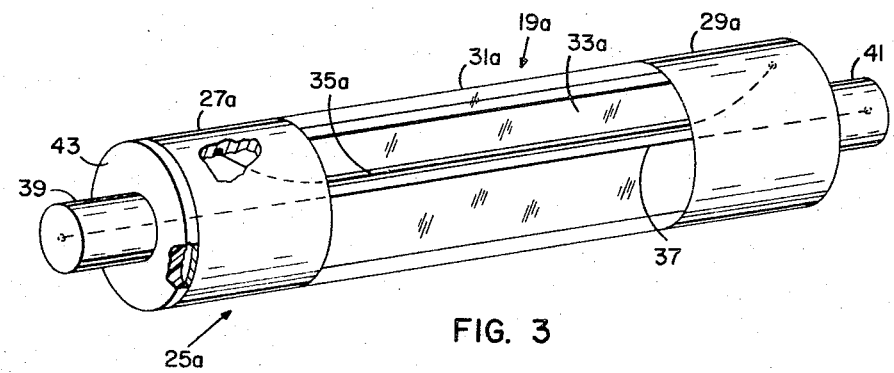
FIGURE 3 is a perspective view, partially cutaway, of another load device that may be used in the variable pulse energy discriminator circuit.

A further refinement of the basic load device shown in FIGURE 2 is illustrated in FIGURE 3. In this device 19a, elements 25a, 27a, 29a, 31a, 33a, and 35a correspond to and have the same function as elements 25, 27, 29, 31, 33 and 35 respectively as described relative to FIGURE 2 supra. In addition to the common elements of these two devices, this device includes a monitor wire 37 that is connected in a conventional manner to terminal 39 at one end and to terminal 41 at the other end. Terminal 39 is connected to terminal 27a and by insulating spacer means 43 and terminal 41 is connected to terminal 29a by an insulating spacer means similar to spacer 43.

The use and action of this device is similar to the previous one with the addition of the capability of electrically monitoring the event of fusing of fuse wire 35a. This monitoring is effected by having monitor wire 37 disposed so as to be rendered discontinuous by fusing of fuse wire 35a or by the ignition of associated chemicals. The fact that monitor wire 37 has been broken can be determined by blocking and electric current that would flow either continuously or intermittently through the monitor wire. The fact that this current can no longer flow can be determined by a lamp, meter, relay, or other suitable means (not shown).

Fusible wire 35 or 35a as discussed relative to FIGURES 2 and 3 respectively is a metallic filament of rather small diameter. A size found to be successful was approximately 0.002 inch diameter. In the aforementioned case, the system level was approximately one joule at 2000 volts. Since current is the property that causes wire fusion, the wire size must be selected so that the peak current at the voltage and energy levels used equals or exceeds 500 amperes per circular mil of wire cross-sectional area. The chemical composition of the fuse wire use has some effect on the intensity of fusion, and the chemical stability of the wire must be particularly considered if the fuse wire is to be used with combustible or mildly explosive chemicals. With these considerations borne in mind, the selection of a gold alloy would be a good choice.

It is to be understood that the form of our invention, herewith shown and described, is to be taken as a preferred example of the same, and that various changes in the arrangement of parts may be resorted to, without departing from the spirit of our invention, or the scope of the subjoined claims.

We claim:
1. A variable pulse energy discriminator device including: an input terminal; common terminal; a spark gap device including first, second and third electrodes, said first and third electrodes forming an ignition gap, said first and second electrodes forming a discharge gap; means connecting the first electrode to the input terminal; storage and discharge means connected in parallel to said third electrode and the common terminal; and a load means connected to said second electrode and said common terminal, whereby when sufficient energy with reference to a preset potential is impressed across the input and common terminals, the ignition gap is caused to conduct thereby applying a maximum current through the ignition gap into said storage means and simultaneously injecting ions into the discharge gap causing conduction across the discharge gap to the load means.

2. A variable pulse energy discriminator device as set forth in claim 1 wherein, the spark gap device is gas filled.

3. A variable pulse energy discriminator device as set forth in claim 1 wherein, the storage means is a capacitor.

4. A variable pulse energy discriminator device as set forth in claim 1 wherein, said storage means includes a capacitor and resistor in series.

5. A variable pulse energy discriminator device as set forth in claim 1, wherein, said load means includes a fuse wire and means for indicating the condition of the fuse wire.

6. A variable pulse energy discriminator device as set forth in claim 1 wherein, said discharge means is a resistor of high ohmic value.

7. A variable pulse energy discriminator device as set forth in claim 1 wherein, said spark gap device is gas filled, said storage means includes a capacitor and resistor in series, said load means includes a fuse wire and means for indicating the condition of the fuse wire, and said discharge means is a resistor of high ohmic value.

8. A variable pulse energy discriminator device as set forth in claim 1, wherein, said load means includes a hollow housing, said housing including two electrical terminals that are interconnected by an intermediate transparent section, an electrical insulating backing strip mounted in said housing between said two terminals, a fuse wire in said housing and connected to said terminals in such a manner that said fuse wire is supported by said backing strip, and means in said housing for indicating the state of the fuse wire.

9. A variable pulse energy discriminator device as set forth in claim 8 wherein said indicating means includes combustible chemicals.

10. A variable pulse energy discriminator device as set forth in claim 8 wherein said indicating means is a monitor wire that is mounted in said housing adjacent said fuse wire.

References Cited

UNITED STATES PATENTS

| | | | |
|---|---|---|---|
| 740,077 | 9/1903 | Bartlett | 313—314 X |
| 2,703,374 | 3/1955 | Fruengel | 313—149 |
| 2,724,792 | 11/1955 | Nessel | 315—241 X |
| 2,820,926 | 1/1958 | Kennedy et al. | 315—238 X |
| 2,853,655 | 9/1958 | Harders et al. | 315—241 X |
| 2,903,625 | 9/1959 | Doerpinghavs | 315—241 X |
| 3,207,947 | 9/1965 | Goncz | 313—306 |

FOREIGN PATENTS 973,680 4/1960 Germany.

JAMES D. KALLAM, *Primary Examiner.*

JOHN W. HUCKERT, *Examiner.*

A. J. JAMES, *Assistant Examiner.*